US005694676A

United States Patent [19]

Lambesis et al.

[11] Patent Number: 5,694,676

[45] Date of Patent: Dec. 9, 1997

[54] METHOD OF MAKING A BOOK BOX

[76] Inventors: Barbara J. Lambesis; Nikos A. Lambesis, both of 2811 N. 7th Ave., Phoenix, Ariz. 85007

[21] Appl. No.: 677,079

[22] Filed: Jul. 9, 1996

[51] Int. Cl.$^{6}$ .................................. B23P 13/04; B27D 1/00

[52] U.S. Cl. ................................ 29/558; 144/345; 144/346

[58] Field of Search ............................ 220/339; 206/406, 206/424; 217/6, 7; 493/56, 59, 60, 61, 67, 68, 84, 90, 92, 102, 111, 114, 115, 128, 340, 349, 383, 386, 387, 405, 905, 908, 912, 955, 959; 29/558; 144/346, 355, 345

[56] References Cited

U.S. PATENT DOCUMENTS

| | | |
|---|---|---|
| 393,432 | 11/1888 | Hebbard . |
| 445,002 | 1/1891 | Grohbrugge . |
| 644,623 | 3/1900 | Mueller . |
| 673,083 | 4/1901 | Mato . |
| 1,233,605 | 7/1917 | Ridley . |
| 1,401,361 | 12/1921 | Preston ..................................... 14/345 |
| 4,781,384 | 11/1988 | Bois ......................................... 273/285 |
| 5,190,295 | 3/1993 | Togni ...................................... 273/285 |

*Primary Examiner*—Joseph J. Hail, III
*Assistant Examiner*—Christopher Day
*Attorney, Agent, or Firm*—Jack C. Munro

[57] ABSTRACT

A method of making a book box which comprises utilizing a solid block of wood which is either of a square or rectangular shape. In the side edge of the solid block there is cut a plurality of closely spaced parallel grooves causing the side edge to resemble the leaves of a book when the book is closed. Within the top surface of the block of wood there is formed an enlarged concavity with the bottom surface of the block of wood being adhesively secured onto the inside surface of a back flap of a book cover. The spine of the book cover is adhesively secured to the side edge. The front flap of the book cover is capable of pivoting between a closed and an open position, and when in the closed position covers the concavity, and in the open position provides access into the concavity.

4 Claims, 1 Drawing Sheet

METHOD OF MAKING A BOOK BOX

BACKGROUND OF THE INVENTION

1) Field of the Invention

The field of this invention is directed to a book box and more particularly to a method of making a container for keepsakes with the container resembling a conventional book, hence "book box."

2) Description of the Prior Art

The manufacturing of containers for keepsakes has long been known. Typical containers are what is referred to as a music box or a jewelry box with the box to be placeable on a supportive surface, such as a dresser or table. Keepsake containers are designed in numerous configurations and sizes. Prior to the present invention, it has not been known to design a keepsake container to resemble a conventional book.

SUMMARY OF THE INVENTION

The method of this invention to make a book box starts with a solid rectangular block of wood which has a side edge formed of mostly planer side panels with each side panel located perpendicular to each other. The side panel that is to be located at the spine of the book is shaped slightly convex and the side panel opposite this convex side panel is shaped slightly concave. A cutter is then utilized to form a plurality of closely spaced parallel identical grooves within each of the side panels except not within the convex side panel. Within the top surface of the block of wood, there is hollowed out an enlarged concavity. The bottom surface of the block of wood is then adhesively secured to the inside surface of the back flap of a book cover. The convex side panel is then adhesively secured to the spine of the book cover. The front flap of the book cover is then capable of being placed onto the top surface of the block of wood covering the concavity giving the appearance of a closed book, or the front flap can be pivoted to an open position providing access to the concavity giving the appearance of an open book.

The primary objective of the present invention is to utilize a method of making a container in the form of a box resembling a book which can be utilized to store keepsake items such as jewelry.

Another objective of the present invention is to provide a method of manufacturing a book box in a relatively inexpensive manner thereby producing an attractive book box which can be sold to the ultimate consumer at a reasonable price.

DETAILED DESCRIPTION OF THE PREFERRED EMBODIMENT

Figure 1:
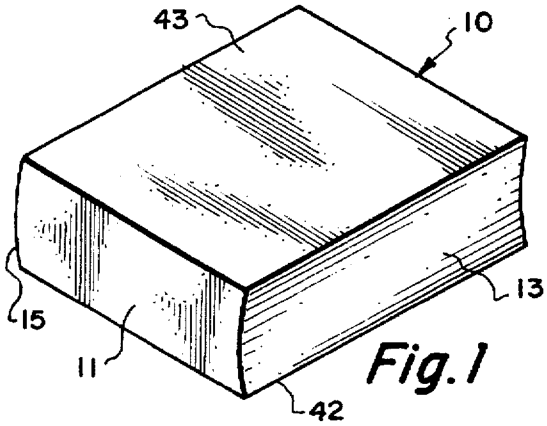
FIG. 1 is an isometric view of the block of wood which is initially used to produce the book box.

Referring particularly to the drawing, there is shown a block of wood 10. This block of wood 10 is rectangular in configuration having side panels 11, 13 and 15 as well as a fourth side panel which is unnumbered. The side panels 11, 13, 15 and the unnumbered side panel are all essentially planer and are located perpendicular to each other. The basic configuration of the block of wood 10 is that of being rectangular or square. The side panels 11, 13, 15 and the unnumbered side panel are located between a top surface 43 and a bottom surface 42. The top surface 43 and the bottom surface 42 are both planer and are parallel to each other.

Figure 2:
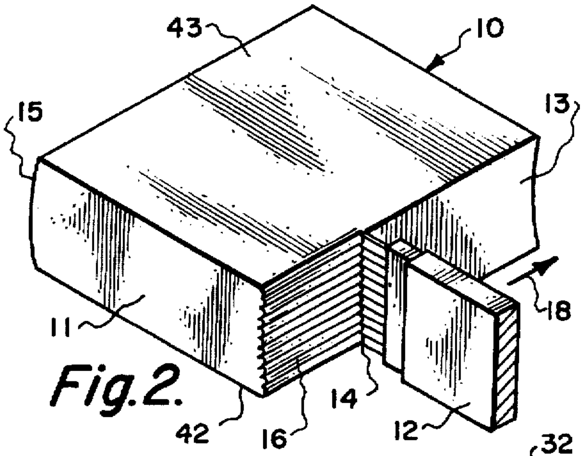
FIG. 2 is an isometric view depicting the producing of the grooves within the side edge of the block of wood.
Figure 3:
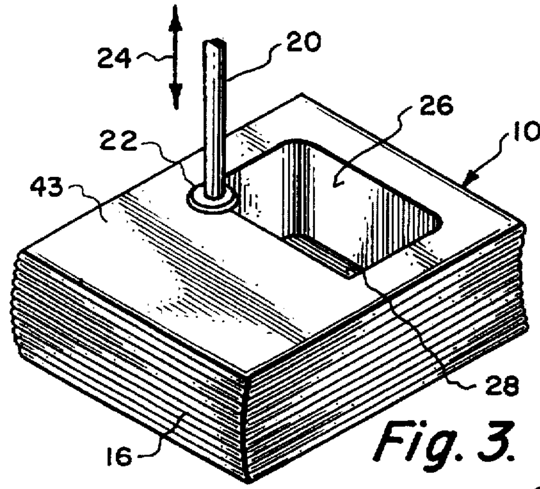
FIG. 3 is an isometric view depicting usage of a router to produce the concavity within the top surface of the book box.

The first step in the manufacturing of the book box is to cut the side panel 15 to be slightly convex. This convex appearance is readily apparent within FIGS. 1 and 2 of the drawing. The next step is to cut the side panel 13 so that it is slightly concave. The side panel 13 is opposite the side panel 15. The next step would be to take a cutter 12, which includes a series of cutting blades 14, and move such longitudinally along side panel 13 in the direction of arrow 18. This will result in producing a series of closely spaced longitudinal grooves 16. The longitudinal dimension of the grooves 16 is parallel to the top surface 43 and the bottom surface 42. The same forming procedure is to be applied to side panel 11 as well as the unnumbered side panel producing a similar series of grooves 16. When the wood block 10 is formed and utilized within the configuration of a book, the grooves 16 will essentially duplicate the appearance of leaves or pages of a book. Also the fact that the side panel 13 is slightly concave will again duplicate the general overall appearance of the leaves or pages of a book. It is to be noted that there are no grooves 16 cut within the side panel 15. The slightly concave shape of side panel 13 could be simultaneously formed when cutting of grooves 16 in side panel 13.

The next step involves utilizing of router blade 22 which is mounted on a router shaft 20. Router blade 22 is to be moved in the direction of arrow 24 to form a hollowed out concavity 26 within the top surface 43. The depth of the concavity 26 will be such that the bottom 28 of the concavity 26 will be slightly spaced from the bottom surface 42. The sidewalls of the concavity 26 are to be spaced some slight distance from the sidewalls 11, 13 and 15 as well as the unnumbered sidewall with generally a spacing of about one-fourth to three-eights of an inch being adequate. Typically the bottom 28 will be about three-sixteenths of an inch from the bottom surface 42.

Figure 5:
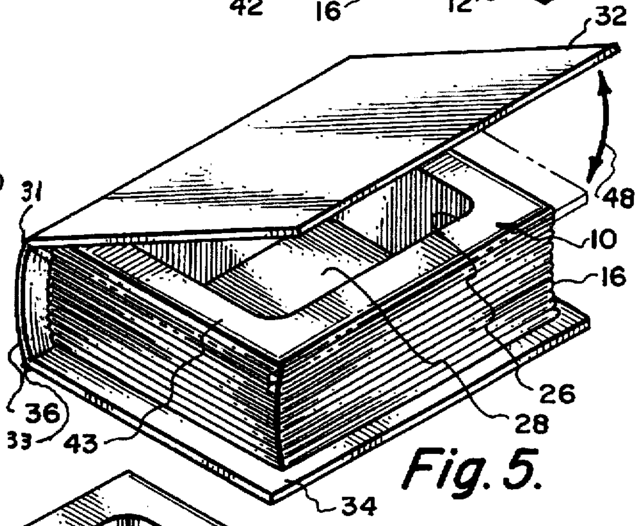
FIG. 5 is an isometric view of a book box that has been created by the method of this invention.
Figure 4:
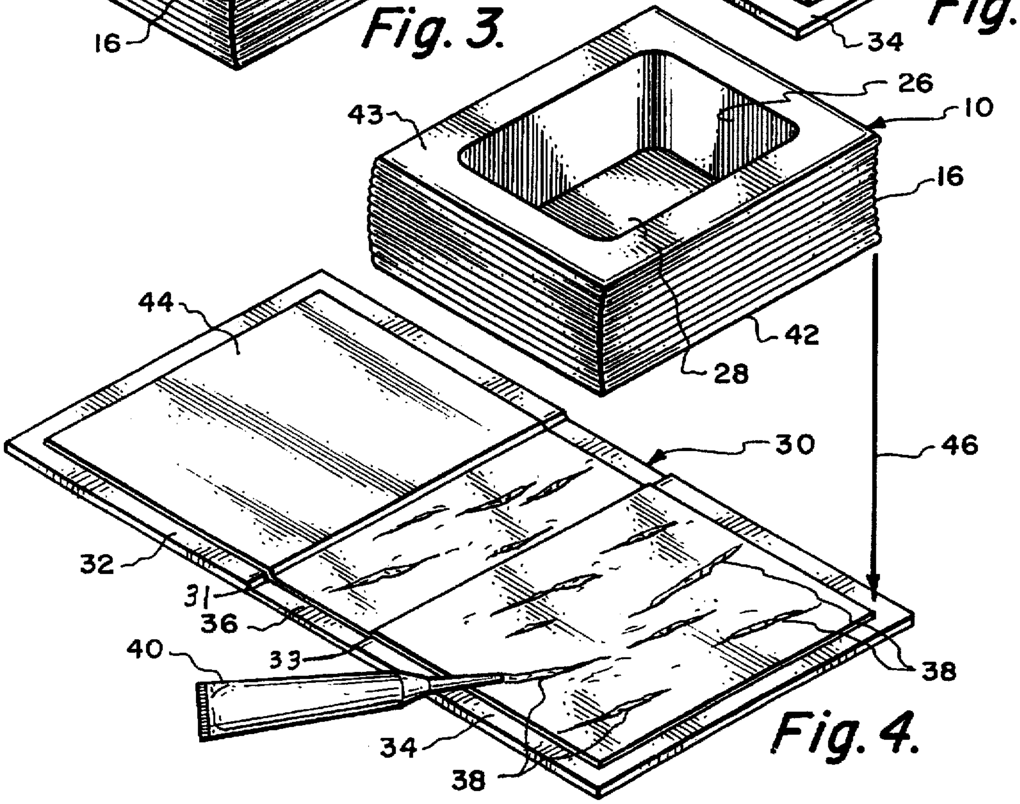
FIG. 4 is an isometric view depicting the mounting of the formed block of wood in conjunction with a book cover.

Next, a cover 30 is utilized which has a front flap 32 and a back flap 34. A spine 36 connects together the front flap 32 and the back flap 34 with there being a hinge 31 located between the front flap 32 and the spine 36 and a hinge 33 located between the spine 36 and the back flap 34. A cover sheet 44 is placed on the inside surface of the front flap 32, the spine 36 and the back flap 34 substantially covering such. Adhesive 38 is to be applied from a tube 40 onto the cover sheet 44 that is mounted on the back flap 34 and the spine 36. The manufacturer then places the bottom surface 42, which is indicated by arrow 46, onto the portion of the cover sheet 44 that is mounted on the back flap 34. Each side panel, such as side panels 11, 13 and 15, are to be aligned or located parallel to its respective edge of the rear flap 34. The spine 36 is then pivoted about hinge 33 until the adhesive located on the cover sheet 44 that is mounted on the spine 36 comes into contact with the side panel 15. The adhesive is then permitted to dry which then secures into position the wood block 10 in relation to the cover sheet 30. The front flap 32 can be pivoted about hinge 31 until front flap 32 can be placed against the top surface 43. In this position, the front flap 32 will cover the concavity 26. This covering position of the front flap 32 is shown in dotted lines in FIG. 5 of the drawing. The book box is now produced by the method of this invention and can be used to store small keepsake items such as jewelry in the concavity 26. The front flap can be pivoted in the direction of arrow 48 to an open position permitting access into the concavity 26.

Normally the grooves 16 will be painted a color, such as a gold. After painting, the wood block 10 would normally be sanded and sealed with a wood sealer. It is to be understood that this painting of the wood block 10 and sealing of the grooves 16 can occur prior to mounting of the wood block 10 onto the cover 30.

What is claimed is:

1. A method of making a book box comprising the following steps:

utilizing a solid block of wood which is polygonal in shape having a side edge dividing a top surface and a bottom surface which are parallel to each other;

cutting a plurality of identical closely spaced parallel grooves in said side edge with a longitudinal dimension of said grooves oriented parallel to said top surface and said bottom surface;

forming an enlarged concavity in said solid block with a access into said concavity being through said top surface;

utilizing a book cover having a front flap and a back flap interconnected by a spine;

adhesively securing said bottom surface of said block of wood to said back flap; and adhesively securing said spine to said side edge which then permits said front flap to be placed against said top surface covering said concavity.

2. The method as defined within claim 1 wherein within the first utilizing step there are four in number of side panels formed within said side edge with one of said side panels being slightly convex and another one of said side panels being slightly concave with the remaining said side panels being planer.

3. The method as defined within claim 2 wherein the cutting step is performed within three of said side panels leaving an uncut said side panel which comprises said slightly convex side panel.

4. The method as defined within claim 3 wherein the second adhesively securing step includes adhesively securing said spine to said slightly convex side panel.

* * * * *